(12) United States Patent
Seok et al.

(10) Patent No.: US 8,230,290 B2
(45) Date of Patent: Jul. 24, 2012

(54) METHOD FOR RETRANSMITTING SIGNALS IN MIMO SYSTEM EMPLOYING HARQ SCHEME

(75) Inventors: Ji Ae Seok, Gyeonggi-do (KR); Jae Hoon Chung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 877 days.

(21) Appl. No.: 12/346,713

(22) Filed: Dec. 30, 2008

(65) Prior Publication Data
US 2009/0282310 A1  Nov. 12, 2009

(30) Foreign Application Priority Data
Jan. 4, 2008  (KR) .................. 10-2008-0001326

(51) Int. Cl.
*G08C 25/02*  (2006.01)
(52) U.S. Cl. .......... 714/748; 706/45; 717/101; 717/120; 719/318; 719/319; 719/320; 700/95; 700/96; 700/103; 700/121; 700/123
(58) Field of Classification Search ................ None
See application file for complete search history.

(56) References Cited

U.S. PATENT DOCUMENTS

| | | | | |
|---|---|---|---|---|
| 2008/0086662 A1* | 4/2008 | Li et al. | ......................... | 714/704 |
| 2008/0256410 A1* | 10/2008 | Park et al. | ..................... | 714/748 |
| 2009/0031185 A1* | 1/2009 | Xhafa et al. | ................... | 714/751 |
| 2009/0098876 A1* | 4/2009 | Khan et al. | ..................... | 455/445 |
| 2009/0304109 A1* | 12/2009 | Kotecha | ........................ | 375/299 |
| 2009/0307558 A1* | 12/2009 | Lee et al. | ..................... | 714/749 |
| 2010/0115359 A1* | 5/2010 | Chung et al. | .................. | 714/748 |
| 2010/0138719 A1* | 6/2010 | Lee et al. | ..................... | 714/752 |

FOREIGN PATENT DOCUMENTS

| | | |
|---|---|---|
| KR | 10-2006-0049146 A | 5/2006 |
| WO | 2006/075870 A1 | 7/2006 |
| WO | 2007/114654 A1 | 10/2007 |

* cited by examiner

*Primary Examiner* — John Trimmings
(74) *Attorney, Agent, or Firm* — Lee, Hong, Degerman, Kang & Waimey

(57) ABSTRACT

A method for retransmitting signals in a MIMO system that uses an HARQ scheme is provided. In the method, an additional codeword-to-layer mapping scheme for retransmission in a MIMO system that uses an HARQ scheme is defined and used to efficiently retransmit signals. In addition, required information is obtained using existing control information to more efficiently retransmit signals in terms of control signal overhead.

5 Claims, 12 Drawing Sheets

FIG. 5
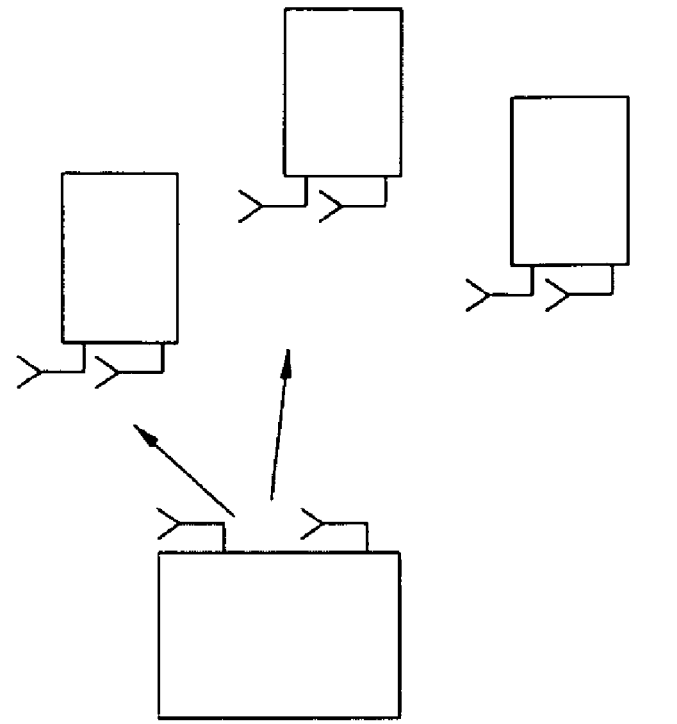
Spatial Division Multiple Access
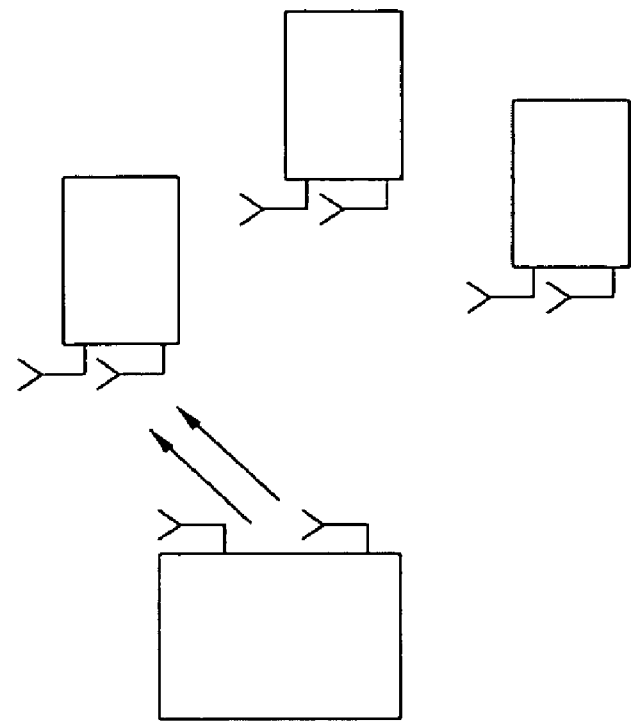
Spatial Multiplexing

METHOD FOR RETRANSMITTING SIGNALS IN MIMO SYSTEM EMPLOYING HARQ SCHEME

CROSS-REFERENCE TO RELATED APPLICATIONS

Pursuant to 35 U.S.C. 119(a), this application claims the benefit of earlier filing date and right of priority to Korean Patent Application No. 10-2008-0001326, filed on Jan. 4, 2008, the contents of which are all hereby incorporated by reference herein in their entirety.

BACKGROUND OF THE INVENTION

1. Field of the Invention

The present invention relates to a Multi-Input Multi-Output (MIMO) system, and more particularly, to a method for efficiently retransmitting signals in a MIMO system that uses a Hybrid Automatic Repeat reQuest (HARQ) scheme.

2. Discussion of the Related Art

Error control algorithms used for current communication systems can be mainly divided into two types, i.e., Automatic Repeat Request (ARQ) and Forward Error Correction (FEC). The ARQ type is divided into a stop and wait ARQ scheme, a go-back-N ARQ scheme, a selective-repeat ARQ scheme, etc. In the stop and wait ARQ scheme, the next frame is transmitted after correct receipt of each transmission (Tx) frame is confirmed through an acknowledgement (ACK) signal. In the Go-Back-N ARQ scheme, if it is determined that transmission is unsuccessful after N consecutive data frames are transmitted, then all data frames transmitted subsequent to an erroneous frame are retransmitted. In the Selective-Repeat ARQ scheme, only erroneous frames are selectively retransmitted.

On the other hand, the Hybrid Automatic Repeat request (HARQ) scheme combines the ARQ scheme and the FEC scheme to control errors and maximize the capability of an error correction code of received data when retransmission is performed. The HARQ scheme is mainly classified into a chase combining (CC) HARQ method and an incremental redundancy (IR) HARQ method according to the characteristics of bits transmitted when retransmission is performed. The CC HARQ method uses the same data as that used for initial transmission when retransmission is performed and increases a signal-to-noise ratio (SNR) at the receiving end, thereby acquiring a gain. The IR HARQ method transmits and combines redundancy bits when retransmission is performed so that the receiving end obtains a coding gain, thereby increasing performance.

The HARQ transmission method can be classified into a synchronous HARQ method and an asynchronous HARQ method. In the synchronous HARQ method, the transmitting end transmits data through predetermined resources at a specific time known to both the transmitting end and the receiving end. Therefore, in the HARQ transmission method, threr is no need to provide signaling information required for transmission, for example, an HARQ process number indicating the identity of data.

On the other hand, in the asynchronous HARQ method, data is transmitted using resources that are allocated at an arbitrary time. Therefore, in the asynchronous HARQ method, it is necessary to provide such signaling information, for example, an HARQ process number, which may increase signaling overhead.

FIG. 1 illustrates an example control signal structure for a conventional synchronous or asynchronous HARQ system.

Specifically, FIG. 1 shows an example control signal structure for use in the 3GPP communication system (See 3GPP TR 25.814). According to this communication standard, a control signal of the HARQ system can be transmitted using only 2-bit control information without the need to indicate the index of a currently transmitted process block. On the other hand, a control signal of the asynchronous HARQ system requires information of a greater number of bits including information required to indicate the index of a currently transmitted process block.

The control information structure shown in FIG. 1 can be represented by the following Table 1.

TABLE 1

| | Field | Size | Comment |
|---|---|---|---|
| Asynchronous HARQ | HARQ process number | 3 | HARQ process indicated by current transmission |
| | Redundancy version | 2 | IR support |
| | New data indicator | 1 | Soft buffer clearing |
| Synchronous HARQ | Retransmission Sequence Number | 2 | Used to derive redundancy version (for IR support) and new data indicator (for soft buffer clearing) |

As can be seen from Table 1, up to 8 combinations of process block indices can be represented through a 3-bit control signal in the asynchronous HARQ system. Table 1 illustrates a control signal for use when the number of process blocks that can be transmitted for each transmission unit is 1. However, the number of transmittable process blocks for each transmission unit in the asynchronous HARQ system may increase in various ways, for example due to the number of process blocks that can be simultaneously transmitted. This may increase the number of bits of a control signal indicating the HARQ process number described above, thereby increasing system overhead.

In the following description, reference will be made to a variety of cases where the number of process blocks transmitted for each transmission unit increases and a description will also be given of a method for reasonably reducing the number of corresponding process block combinations in such cases.

FIG. 2 illustrates a stop-and-wait HARQ scheme.

As described above, the HARQ scheme combines the ARQ scheme and the FEC scheme to control errors and maximizes the capability of an error correction code of received data when retransmission is performed. Specifically, the receiving end (Rx) transmits an ACK signal if no error is detected in received data and transmits a NACK signal if an error is detected. When the transmitting end (Tx) receives an ACK signal, the transmitting end (Tx) transmits next data. When the transmitting end (Tx) receives a NACK signal, the transmitting end (Tx) retransmits the same data as that in which an error has occurred. Here, the format of retransmitted data may be changed according to the HARQ type.

Particularly, the stop-and-wait protocol of FIG. 2 delays transmission of data by a round trip time (RTT) that passes until the transmitting end (Tx) receives an ACK/NACK signal from the receiving end (Rx) and then transmits the delayed data. Although the stop-and-wait protocol of FIG. 2 is the simplest and most effective transmission method, the method may reduce link transmission efficiency due to delay of the RTT.

The following N-channel stop-and-wait HARQ scheme may be used to solve this problem.

FIG. 3 illustrates an N-channel stop-and-wait HARQ structure.

In the stop-and-wait HARQ scheme, a data receiving end can generally determine whether or not data has been successfully received using an error detection code such as a cyclic redundancy check (CRC) code. In the following description, each data unit in which an error can be detected will be referred to as an "HARQ process block" or simply referred to as a "process block" unless such use causes confusion, for ease of explanation. Identifiers used to discriminate between HARQ process blocks that can be transmitted within a predetermined interval, for example 1 Round Trip Time (RTT), in the system will be referred to as "HARQ process indices".

In the general stop-and-wait HARQ scheme illustrated in FIG. 2, transmission of data is delayed by an RTT that passes until an ACK/NACK of a process block is received after the process block is transmitted as described above. On the other hand, in the N-channel stop-and-wait HARQ scheme illustrated in FIG. 3, N process blocks that can be transmitted within an RTT are transmitted and, thereafter, individual ACK/NACK signals for the N process blocks are received. While this method increases link efficiency, it may increase the number of process block indices that can be transmitted within an RTT by N times.

In the case where the system has a wide bandwidth for transmission or data is transmitted using a MIMO scheme, a number of HARQ process blocks can be simultaneously transmitted.

FIG. 4 illustrates a transmission method based on a multiple HARQ processing scheme.

As shown in FIG. 4, m HARQ processes can simultaneously transmit m HARQ process blocks at a specific time. When the receiving end has received data, it can transmit m ACK/NACK signals for m HARQ process blocks to the transmitting end. The method in which m process blocks are simultaneously transmitted in this manner can be combined with the N-channel stop-and-wait method as shown in FIG. 3 to increase system link performance.

In the case where a plurality of process blocks is simultaneously transmitted in this manner, each HARQ process through which each process block is transmitted is referred to as a "layer" for ease of explanation in the following description. The layer may correspond to either each band when a plurality of process blocks is simultaneously transmitted due to a wide system bandwidth in a communication system or each antenna through which data is simultaneously transmitted in a MIMO communication system. The following is a brief description of the MIMO communication system as an example system which employs a plurality of layers as described above.

In the Multi-Input Multi-Output (MIMO) scheme, a base station and a mobile terminal each include two or more antennas to transmit data through multiple paths and the receiving end detects signals received through the paths. This MIMO scheme can be classified into a variety of schemes such as spatial diversity, transmit diversity, beamforming, spatial multiplexing for a single user, spatial multiplexing for multiple users, etc.

In the spatial diversity scheme, the same data is transmitted through a plurality of antennas. This scheme enables reliable operation when the reliability of Channel Quality Information (CQI) feedback from a terminal is low due to fading. In addition, in the case where there is a need to provide a service containing traffic sensitive to delay, the spatial diversity scheme can efficiently cope with the fading using diversity without waiting for a good channel condition. As a representative MIMO communication technology, the transmit diversity scheme can be used when the transmitter has multiple antennas and a channel condition is unknown.

On the other hand, the beamforming scheme assigns different weights according to channel conditions to signals of multiple antennas to increase a Signal to Interference plus Noise Ratio (SINR). In the case of the transmit beamforming scheme, it is necessary to provide an additional feedback since there are difficulties in determining channel conditions and thus how to efficiently support the feedback is an important factor in system design.

The following is a brief description of both the spatial multiplexing scheme for a single user and the spatial multiplexing scheme for multiple users.

FIG. 5 illustrates a Spatial Multiplexing (SM) scheme and a Spatial Division Multiple Access (SDMA) scheme for use in a MIMO communication system.

The spatial multiplexing scheme for a single user is also referred to as SM or Single User MIMO (SU-MIMO). In this scheme, data is transmitted through multiple antennas of one user in the manner as shown in the left side of FIG. 5. Thus, the MIMO-channel capacity increases in proportion to the number of antennas. On the other hand, the spatial multiplexing scheme for multiple users is referred to as SDMA or Multi-User MIMO (MU-MIMO). In this scheme, data is transmitted and received through antennas of multiple users in the manner as shown in the right side of FIG. 5.

When data is transmitted in the MIMO mode, it is necessary to add a variety of information such as a rank index, a Precoding Vector Index (PVI), and an interference vector. The rank index is an index used to indicate the number of transmission ranks assigned to each allocated resource element and the PVI indicates a preceding vector which a UE (or terminal) will use in each resource element allocated in a resource allocation field.

On the other hand, when the MIMO scheme described above is applied in two modes, i.e., a Single CodeWord (SCW) mode and a Multi-CodeWord (MCW) mode. In the SCW mode, a single codeword, which is an error-detectable unit, is simultaneously transmitted through multiple antennas. In the MCW mode, several codewords are simultaneously transmitted through multiple antennas.

FIG. 6 illustrates a structure of a transmitting end in a multiple codeword (MCW) MIMO system.

As shown in FIG. 6, encoding (e.g., turbo-encoding of FIG. 6) and modulation (e.g., QAM modulation of FIG. 6) are performed on M data packets to produce M codeword HARQ process blocks. The M codeword HARQ process blocks are mapped to layers at the MIMO portion and the layers are then combined with an efficient antenna signaling according to the number of ($M_t$) physical antennas and are then transmitted to the receiving end. Thereafter, the receiving end feeds back channel quality information of each antenna so that the coding rate and the modulation scheme can be adjusted according to the channel quality information.

On the other hand, codewords and physical antennas may have mapping relationships described below.

FIG. 7 illustrates an example mapping relationship between codewords and physical antennas.

Specifically, FIG. 7 illustrates codeword-to-layer mapping for spatial multiplexing in downlink in 3GPP TS 36.211.

As illustrated in FIG. 7, in the case of rank 1, one codeword is mapped to one layer and is then transmitted through four antennas via a precoder. In the case of rank 2, two codewords are mapped to two layers and the two layers are then mapped to four antennas through a precoder. In the case of rank 3, one of two codewords is mapped to two layers through a serial-to-parallel (S/P) converter such that a total of two codewords are mapped to three layers and the three layers are then mapped to four antennas through a precoder. In the case of rank 4, each of two codewords is mapped to two layers through an S/P converter such that a total of four layers are mapped to four antennas through a precoder. The number of simultaneously transmitted codewords (i.e., HARQ process blocks) can be determined based on the number of ranks.

However, in the case where one codeword is retransmitted among a plurality of transmitted codewords due to failure of transmission of the codeword after data is transmitted using the rank 3 or the rank 4 in the system which uses the codeword-to-layer mapping schemes described above with reference to FIG. 7, the rank number for transmission should be forcibly reduced from the rank 3 or the rank 4 shown in FIG. 7 to retransmit the codeword. In this case, it is difficult to use the HARQ chase combining described above and only half of the resources used for initial transmission are used, thereby reducing efficiency. In addition, if a high coding rate is applied to transmit data when initial transmission is performed, the coding gain may be significantly reduced when retransmission is performed.

Accordingly, there is a need to provide an efficient data processing method for retransmitting signals from a transmitting end in a MIMO system that uses an HARQ scheme in order to overcome the above problems.

SUMMARY OF THE INVENTION

An object of the present invention devised to solve the problem lies on providing a method for retransmitting signals wherein an additional codeword-to-layer mapping scheme for retransmission in a MIMO system that uses an HARQ scheme is defined and used to efficiently retransmit signals.

Another object of the present invention devised to solve the problem lies on providing a method for retransmitting signals wherein required information is obtained using existing control information to more efficiently retransmit signals in terms of control signal overhead.

In accordance with an embodiment of the present invention, the above and other objects can be achieved by providing a method for transmitting a signal from a transmitting end in a Multi-Input Multi-Output (MIMO) system that uses a Hybrid Automatic Repeat request (HARQ) scheme. In an embodiment to accomplish this aspect, the method includes a) determining whether or not a codeword to be transmitted is a retransmission codeword, b) performing signal mapping according to a codeword-to-layer mapping scheme for retransmission when the codeword is a retransmission codeword, and c) performing preceding on the mapped signal and transmitting the precoded signal using a plurality of antennas, wherein the MIMO system supports a codebook for retransmission in which a preceding vector supporting the codeword-to-layer mapping scheme for retransmission is defined using at least one predetermined index, and the transmitting end performs the steps b) and c) when the codeword is a retransmission codeword and the transmitting end has received an index used to define a preceding vector according to the codeword-to-layer mapping scheme for retransmission in the codebook for retransmission.

Here, while the codeword-to-layer mapping scheme for retransmission may include a variety of schemes as described later with reference to FIG. 9, the codeword-to-layer mapping scheme for retransmission may be set to include a scheme for mapping one codeword to two layers which is additionally defined as described later with reference to FIG. 8.

In addition, at the step a), the determination may be performed using a Retransmission Sequence Number (RSN) field of existing control information rather than using additional control information.

In accordance with another embodiment of the present invention, the above and other objects can be achieved by providing a method for retransmitting a signal from a transmitting end in a Multi-Input Multi-Output (MIMO) system which uses a Hybrid Automatic Repeat reQuest (HARQ) scheme and which supports a codebook for retransmission in which a preceding vector supporting a codeword-to-layer mapping scheme for retransmission is defined using a predetermined index. In an embodiment to accomplish this aspect, the method includes a) receiving control information of a transmission signal, b) performing signal mapping on the transmission signal according to the codeword-to-layer mapping scheme for retransmission when the control information indicates that the transmission signal is a retransmission signal and indicates the predetermined index in the codebook for retransmission, and c) mapping the mapped signal to a plurality of antennas using a preceding vector that supports the codeword-to-layer mapping scheme for retransmission.

Here, the preceding vector that supports the codeword-to-layer mapping scheme for retransmission may include a first preceding vector that supports a scheme for mapping one codeword to two layers and a second preceding vector that supports a scheme for mapping one codeword to four layers. In this case, the transmitting end may select a preceding vector to be used at the step c) from among the first preceding vector and the second preceding vector according to number-of-layer information indicated by the control information.

According to each of the embodiments of the present invention described above, it is possible to efficiently define and use a codeword-to-layer mapping scheme for retransmission in a MIMO system that uses an HARQ scheme and also to obtain required information using existing control information, thereby more efficiently retransmitting signals in terms of control signal overhead.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 5 illustrates a Spatial Multiplexing (SM) scheme and a Spatial Division Multiple Access (SDMA) scheme for use in a MIMO communication system.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

Figure 7:
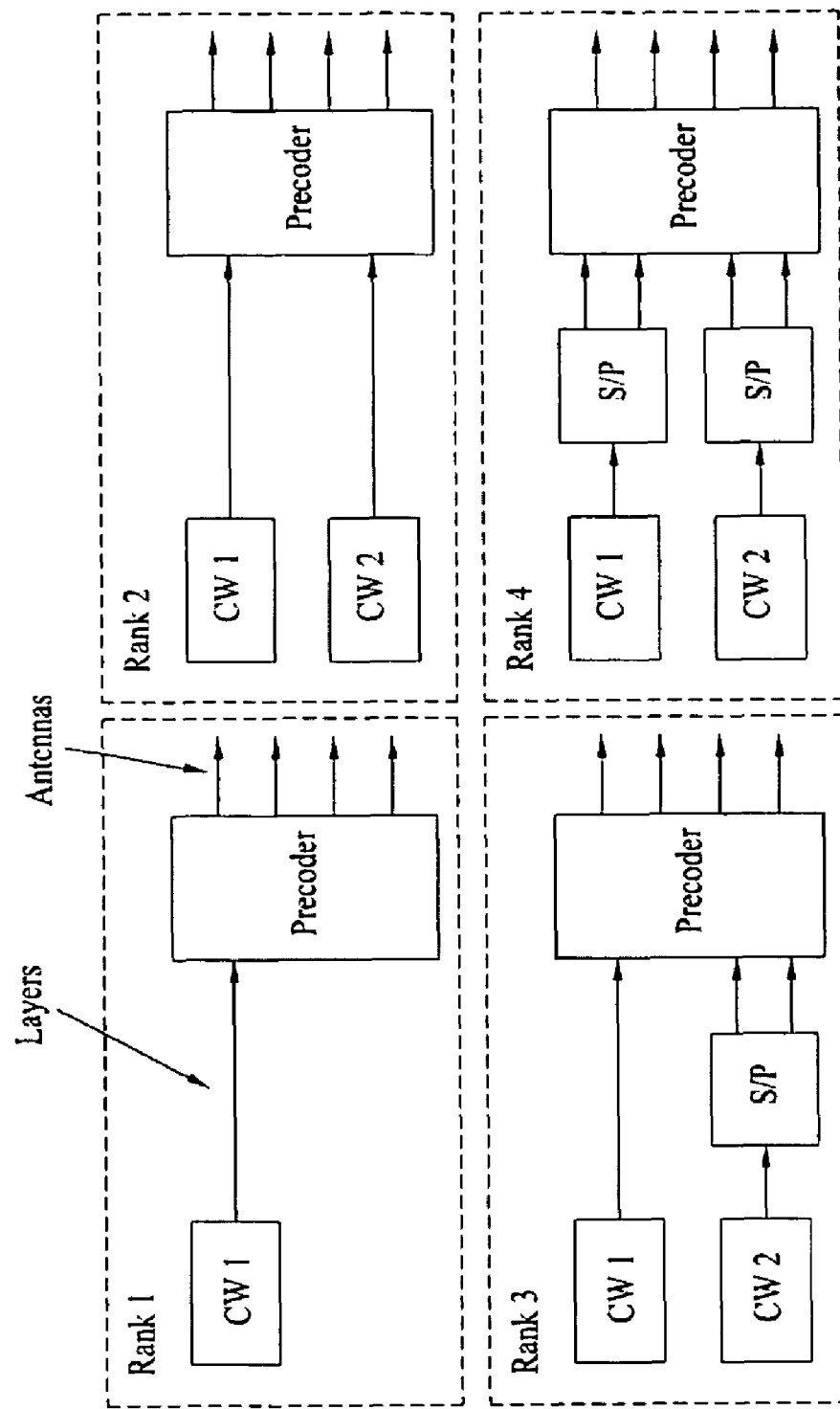
FIG. 7 illustrates an example mapping relationship between codewords and physical antennas.

In the case where one codeword is retransmitted among a plurality of transmitted codewords due to failure of transmission of the codeword after data is transmitted using the rank 3 or the rank 4 when only the codeword-to-layer mapping scheme as shown in FIG. 7 is used in a MIMO system that uses an HARQ scheme as described above, the rank number should be forcibly reduced from the rank 3 or the rank 4 shown in FIG. 7 to retransmit the codeword. In this case, it is difficult to use the HARQ chase combining described above and only half of the resources used for initial transmission are used, thereby reducing efficiency. In addition, if a high coding rate is applied to transmit data when initial transmission is performed, the coding gain may be significantly reduced when retransmission is performed.

Further, when the transmitting end receives information of a channel status from the receiving end with the rank set to "1", the transmitting end must perform mapping of the rank 1. However, when the rank information that the transmitting end has received is 2 or higher, the transmitting end needs to forcibly reduce the rank to "1" to perform retransmission and therefore channel status values (for example, CQI and a preceding matrix) that the transmitting end contains become different from those of the receiving end, thereby reducing performance.

Accordingly, an embodiment of the present invention suggests a method for additionally defining and using a codeword-to-layer mapping scheme as follows as an efficient data processing method for retransmission from a transmitting end in a MIMO system that uses an HARQ scheme.

Figure 8:
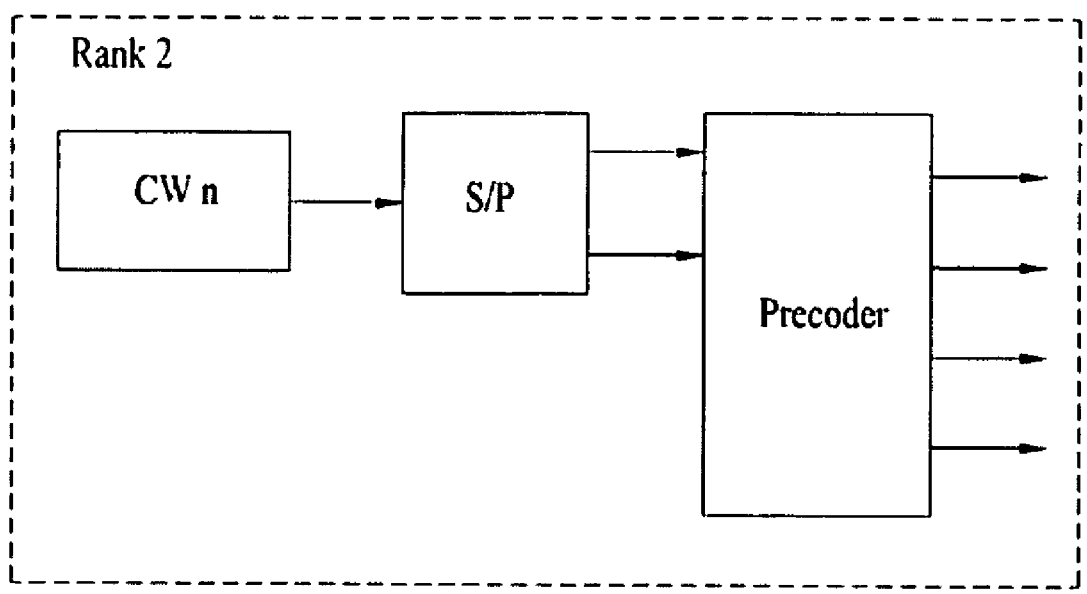
FIG. 8 illustrates a codeword-to-layer mapping scheme which is additionally defined according to an embodiment of the present invention and which can be used for retransmission in a MIMO system that uses an HARQ scheme.

FIG. 8 illustrates a codeword-to-layer mapping scheme which is additionally defined according to an embodiment of the present invention and which can be used for retransmission in a MIMO system that uses an HARQ scheme.

Specifically, FIG. 8 illustrates a mapping scheme in which a specific codeword is mapped to two layers through an S/P converter and the two layers are then mapped to four antennas through a precoder. This mapping scheme can be used when retransmission is performed due to failure of transmission of one codeword after initial transmission is performed using the rank 3 or the rank 4 in the mapping scheme shown in FIG. 7. How the mapping scheme additionally defined according to the embodiment of the present invention is used in retransmission is described below in more detail with reference to the drawings.

Figure 9:
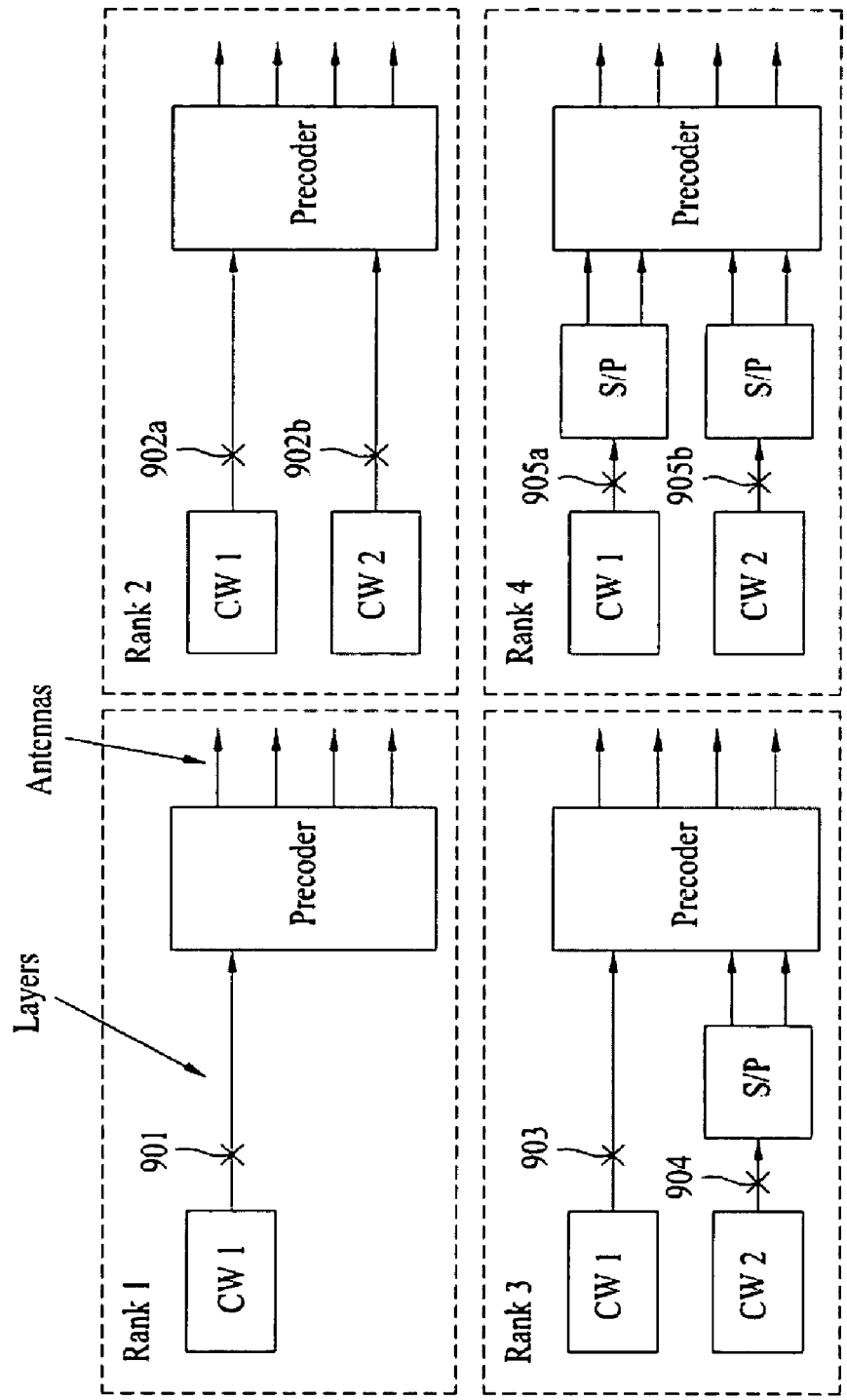
FIG. 9 illustrates how the mapping scheme suggested in FIG. 8 is used in retransmission in a MIMO system that uses an HARQ scheme.

FIG. 9 illustrates how the mapping scheme suggested in FIG. 8 is used in retransmission in a MIMO system that uses an HARQ scheme.

First, in the case where it is determined that transmission of a codeword 1 has failed after initial transmission is performed using the mapping scheme defined for the rank 1 (901), retransmission is, of course, performed according to the mapping scheme defined for the rank 1. In addition, in the case where it is determined that transmission of the codeword 1 or the codeword 2 has failed after initial transmission of the codeword 1 and the codeword 2 is performed using the mapping scheme defined for the rank 2 (902*a*, 902*b*), retransmission may be performed according to the mapping scheme defined for the rank 1 among the predefined mapping schemes. In the case where it is determined that transmission of the codeword 2 has failed after initial transmission of the codeword 1 and the codeword 2 is performed using the mapping scheme defined for the rank 3 (904), retransmission may also be performed according to the mapping scheme defined for the rank 1 among the predefined mapping schemes.

On the other hand, in the case where it is determined that transmission of the codeword 1 has failed after initial transmission of the codeword 1 and the codeword 2 is performed using the mapping scheme defined for the rank 3 (903), the following problem may occur if retransmission is performed using the predefined mapping scheme. Accordingly, in this case (903), retransmission can be optimized by performing retransmission using a mapping scheme additionally defined as shown in FIG. 8. The present invention also suggests that a mapping scheme additionally defined as shown in FIG. 8 be used instead of using the predefined mapping scheme in the case where it is determined that transmission of the codeword 1 or the codeword 2 has failed after initial transmission of the codeword 1 and the codeword 2 is performed using the mapping scheme defined for the rank 4 (905*a* and 905).

Using such a retransmission scheme, it is possible to efficiently perform chase combining even when retransmission of a codeword is performed due to failure of transmission of the codeword while overcoming the problem of non-matching of channel information between the transmitting and receiving ends.

However, the following problem may occur in association with the control signal size in the case where a codeword-to-layer mapping method is added to achieve efficient retransmission according to the embodiment described above. To explain this, a control signal required in a MIMO system that uses an HARQ scheme is described in more detail below.

Figure 1:
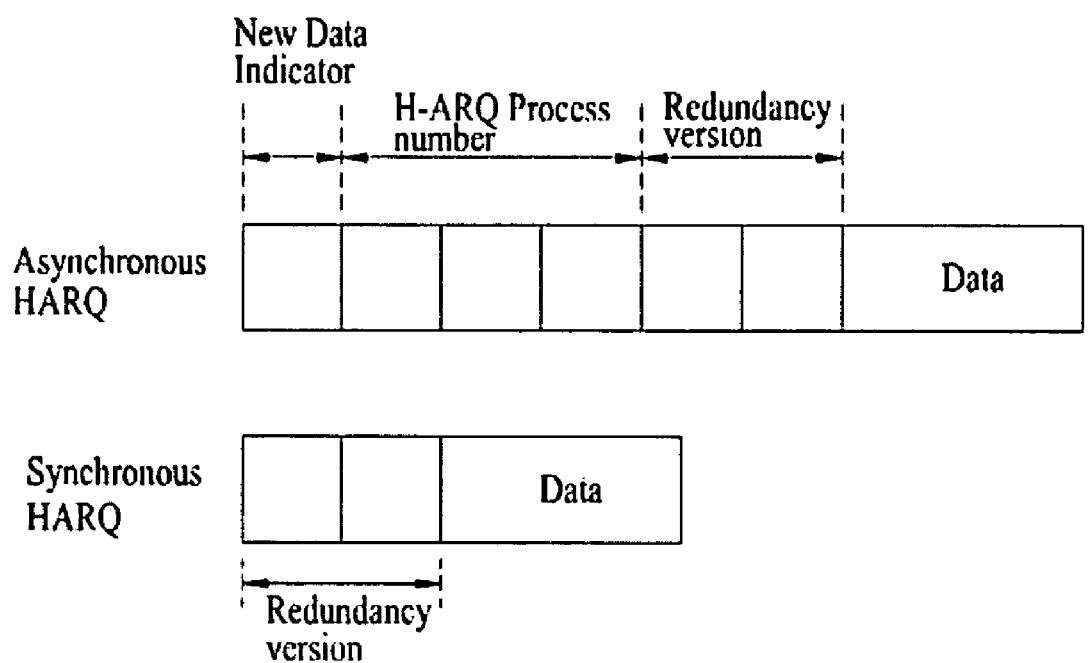
FIG. 1 illustrates an example control signal structure for a conventional synchronous or asynchronous HARQ system.
Figure 2:
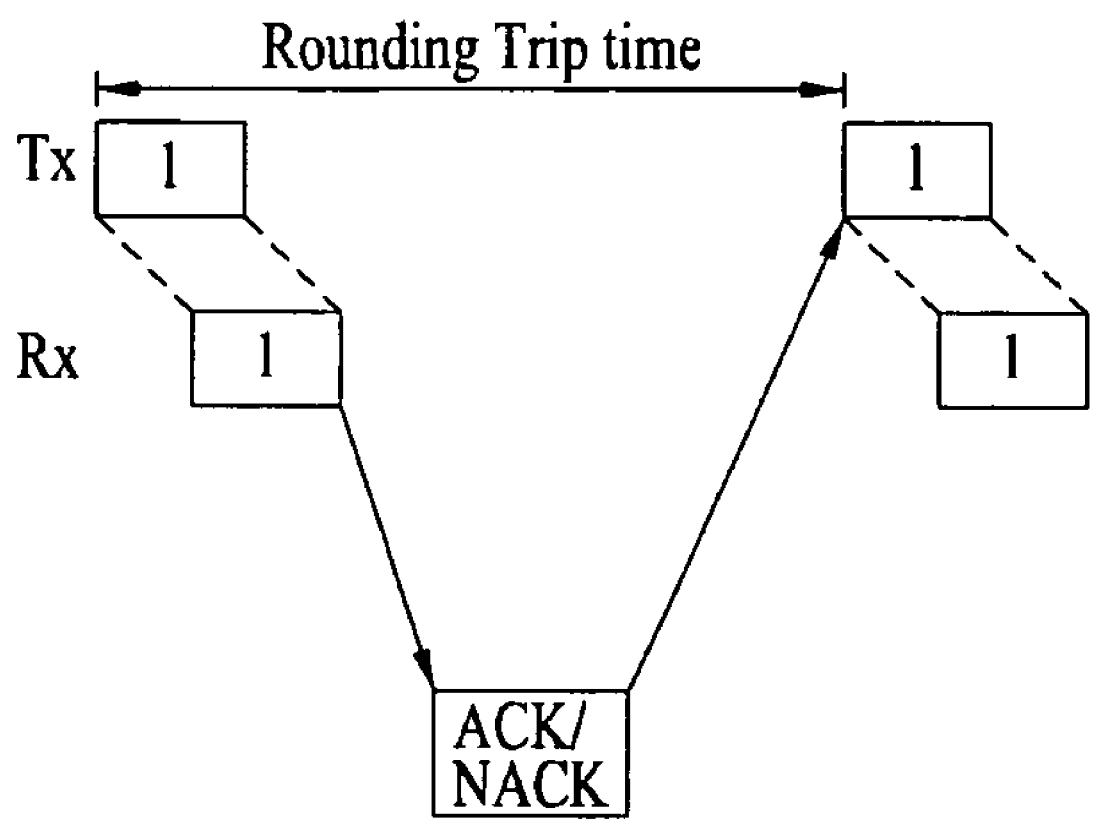
FIG. 2 illustrates a stop-and-wait HARQ scheme.
Figure 3:
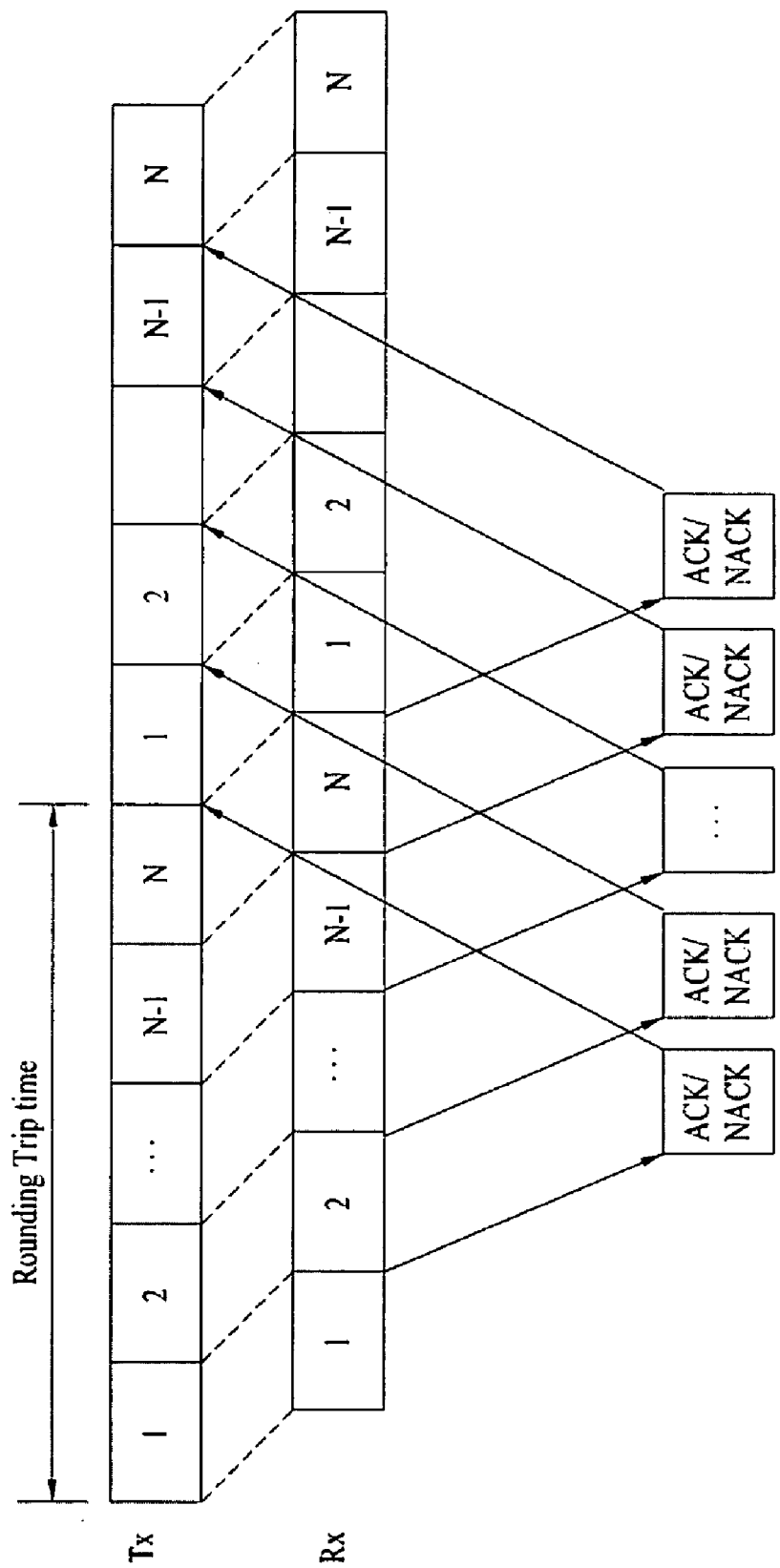
FIG. 3 illustrates an N-channel stop-and-wait HARQ structure.
Figure 4:
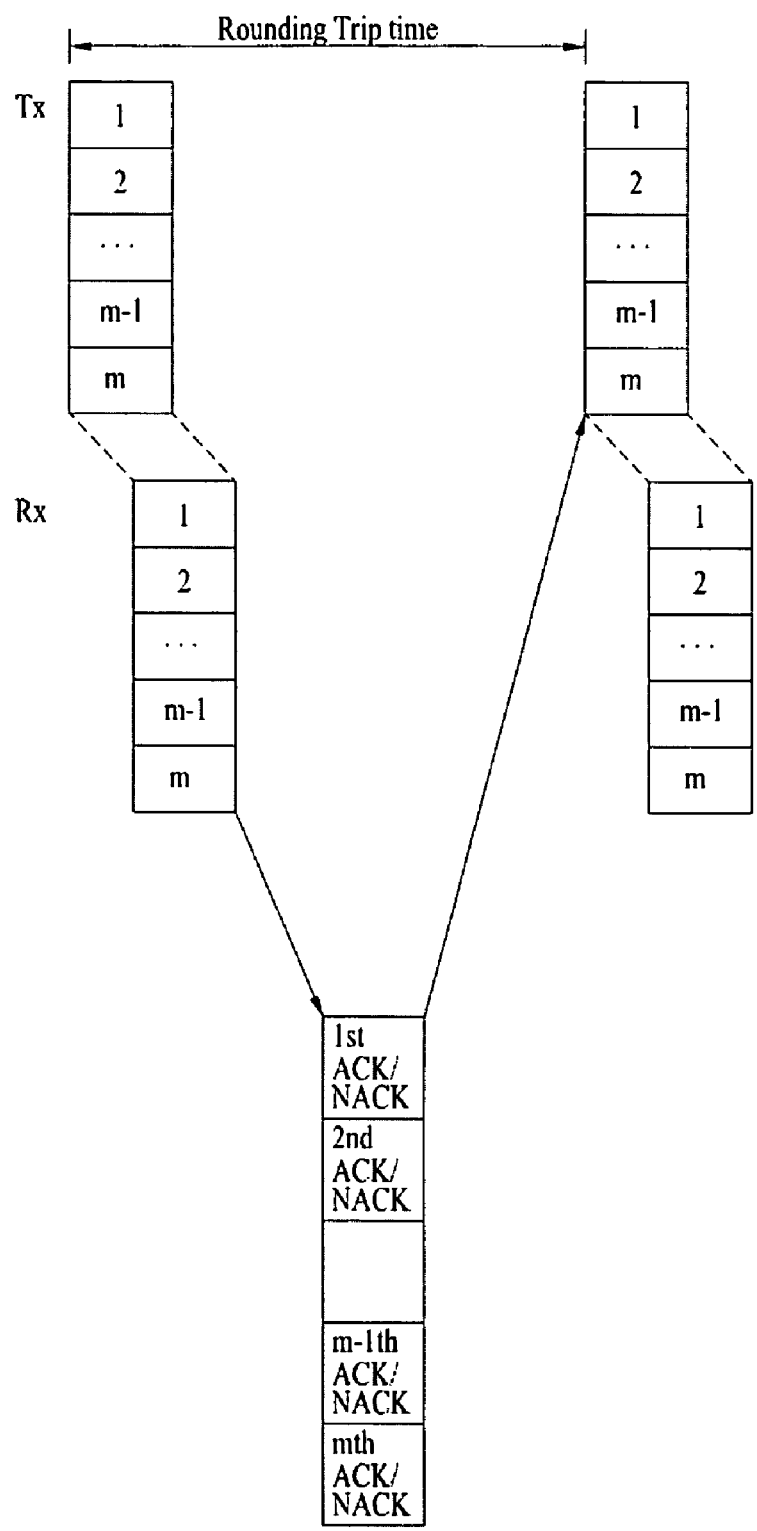
FIG. 4 illustrates a transmission method based on a multiple HARQ processing scheme.
Figure 6:
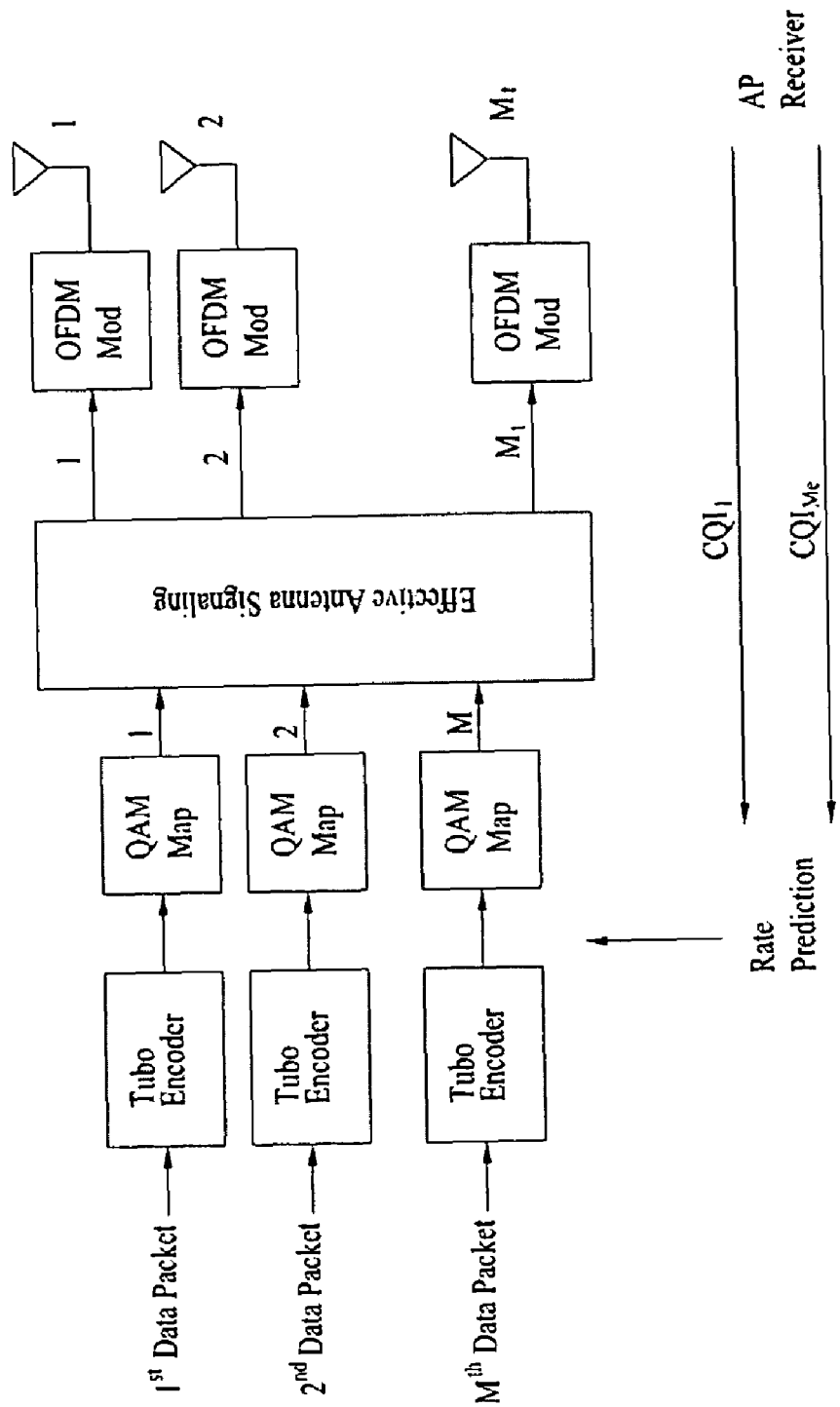
FIG. 6 illustrates a structure of a transmitting end in a multiple codeword (MCW) MIMO system.

The number of combinations of process block indices that may occur in the case where m layers are used as described above with reference to FIG. 4 and an N-channel stop-and-wait HARQ scheme is used as described above with reference to FIG. 3 can be expressed as follows.

$$_{mn}P_m + {}_{mn}P_{(m-1)} + {}_{mn}P_{(m-2)} + \ldots + {}_{mn}P_2 + {}_{mn}P_1 \text{ combinations} \quad \text{[MATHEMATICAL EXPRESSION 1]}$$

Accordingly, the number of bits (x) of a control signal required to indicate the HARQ process block index combinations can be expressed as follows.

$$\{\min(x) | 2^x \geq {}_{mn}P_m + {}_{mn}P_{(m-1)} + {}_{mn}P_{(m-2)} + \ldots + {}_{mn}P_2 + {}_{mn}P_1, x: \text{integer}\} \quad \text{[MATHEMATICAL EXPRESSION 2]}$$

The following is a specific example wherein the HARQ process block index combinations are indicated using this method.

On the other hand, in the case where the number of HARQ process blocks that are simultaneously transmitted, i.e., the number of simultaneously transmitted layers, is reported through a signal unlike the above case, the number of bits (x) required to represent the HARQ process block index combinations can be expressed as follows.

$$\{\min(x) | 2^x \geq \max({}_{mn}P_m + {}_{mn}P_{(m-1)} + {}_{mn}P_{(m-2)} + \ldots + {}_{mn}P_2 + {}_{mn}P_1), x: \text{integer}\} \quad \text{[MATHEMATICAL EXPRESSION 3]}$$

In another method to reduce overhead of control information, the same N bits as those used to identify HARQ process IDs in the Single-Input Multi-Output (SIMO) scheme may be used in the MIMO scheme described above. This method is described below with reference to the drawings.

Figure 10:
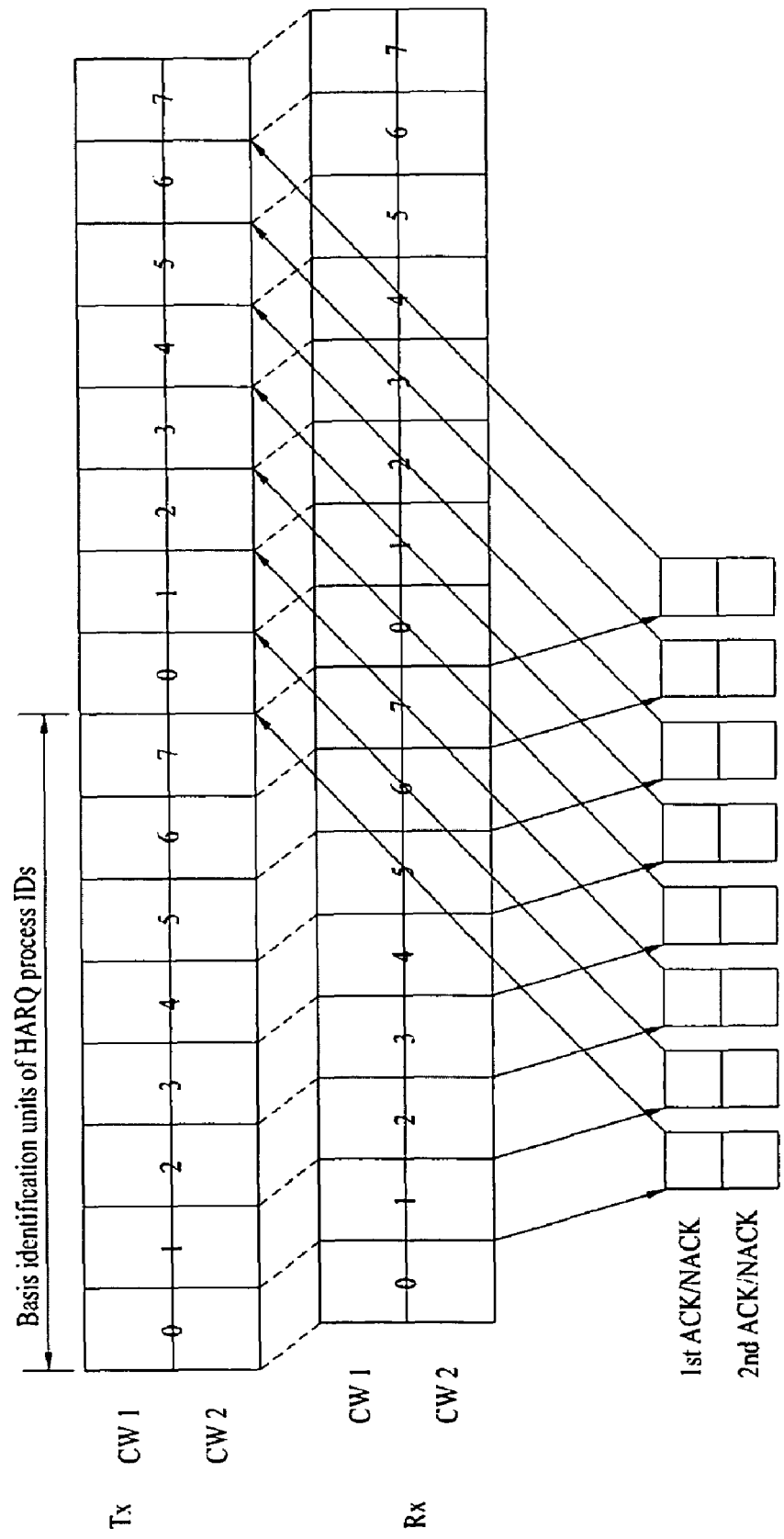
FIG. 10 illustrates a method in which simultaneously transmitted process blocks are set to share indices in a MIMO system which simultaneously generates and transmits two codewords.

FIG. 10 illustrates a method in which simultaneously transmitted process blocks are set to share indices in a MIMO system which simultaneously generates and transmits two codewords.

In the case where up to 8 HARQ process blocks can operate during 1 Round Trip Time (RTT) and up to 2 HARQ process blocks can be simultaneously transmitted as in the example shown in FIG. 10, up to 16 HARQ process blocks can be transmitted through two layers. In this case, all process block indices can be represented using 3 bits in the MIMO mode if simultaneously transmitted HARQ process blocks are set to share HARQ process block indices 0 to 7 as shown in FIG. 10 instead of assigning one index to each process block as in the conventional method.

The following is a table illustrating all control information required when such a transmission scheme is used.

TABLE 2

| | Field | Bits | Comment |
|---|---|---|---|
| General | RB assignment | ? | Number of bits depends on the resource indication scheme selected (if necessary, includes any explicit information to handle distributed transmission) |
| | CRC | 16-20 | MAC ID implicitly encoded in the CRC. The MAC ID is 16 bits |
| | TPC | 2-4 | Power control of PUCCH |
| First transport block | Transport format | 4-7 | Approach 1: signal MCS, comput transport block size from resource block assignment<br>Approach 2: signal transport block size index and modulation scheme, compute code rate and actual transport block size from resource block assignment (similar to HSDPA) |
| | Hybrid ARQ process number | 3 | Depends on the number of HARQ processes used, TDD may need a larger/smaller number than FDD for certain allocations → different PDCCH sizes for FDD and TDD |
| | Retransmission sequence number (RSN) | 2-3 | Approach 1: RSN (2 bits) doubles as new data indicator (=0 indicates new data, >0 indicates retransmission) and redundancy version.<br>Approach 2: Separate new data indicator (1 bit) and redundancy version (2 bits) |
| Information needed for spatial multiplexing SU-MIMO support | | | |
| Information needed for MU-MIMO is FFS | | | |
| Second transport block (MIMO support) | Number of layers | 0-2 | 1, 2, 3 or 4 layers (4 Tx eNodeB) or 1, 2 layers (2 Tx eNodeB)<br>The need depends on the rank adaptation scheme adopted |
| | Transport format | 3-7 | Approach 1: signal MCS, compute transport block size from resource block assignment<br>Approach 2: signal transport block size index and modulation scheme, compute code rate and actual transport block size from resource block assignment (similar to HSDPA)<br>Approach 3: obtained relative to the transport format for the first code word |
| | Hybrid ARQ process number | 0 | According to minutes from RAN1#47bis, there is full flexibility in mapping between HARQ process and codewords. The understanding of "full flexibility" was different between companies. To be considered if the process number could be derived from first transport block e.g. |

TABLE 2-continued

| Field | Bits | Comment |
|---|---|---|
| Retransmission sequence number (RSN) | 0-3 | as in Rel-7. Approach 1: RSN (2 bits) doubles as new data indicator (=0 indicates new data, >0 indicates retransmission) and redundancy version. Approach 2: Separate new data indicator (1 bit) and redundancy version (2 bits) |
| Precoding information | 4 | When a codebook of the following Table 3 is used. |

"RAN1#47bis" in Table 2 represents a 3GPP LTE-related RAN1 47th conference (St. Louis, USA). The transmitting end can determine whether or not the corresponding data is retransmission data, through an "RSN" field among the control information fields of Table 2, and can obtain information regarding the number of layers used to transmit the corresponding data through a "number of layer" field.

The preceding information in Table 2 represents the number of bits required when a codebook for use in a MIMO system which generally uses 4 antennas and 2 codewords as shown in Table 3 is used.

TABLE 3

| Codebook Index | $u_n$ | Number of Layers v | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(134)}/\sqrt{3}$ | $W_0^{(1234)}/2$ |
| 1 | $u_1 = [1\ -j\ 1\ j]^T$ | $W_1^{(1)}$ | $W_1^{(14)}/\sqrt{2}$ | $W_1^{(134)}/\sqrt{3}$ | $W_1^{(1234)}/2$ |
| 2 | $u_2 = [1\ 1\ -1\ 1]^T$ | $W_2^{(1)}$ | $W_2^{(14)}/\sqrt{2}$ | $W_2^{(134)}/\sqrt{3}$ | $W_2^{(1234)}/2$ |
| 3 | $u_3 = [1\ j\ 1\ -j]^T$ | $W_3^{(1)}$ | $W_3^{(14)}/\sqrt{2}$ | $W_3^{(134)}/\sqrt{3}$ | $W_3^{(1234)}/2$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(134)}/\sqrt{3}$ | $W_4^{(1234)}/2$ |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(134)}/\sqrt{3}$ | $W_5^{(1234)}/2$ |
| 6 | $u_6 = [1\ (1+j)/\sqrt{2}\ -j\ (-1+j)/\sqrt{2}]^T$ | $W_6^{(1)}$ | $W_6^{(14)}/\sqrt{2}$ | $W_6^{(134)}/\sqrt{3}$ | $W_6^{(1234)}/2$ |
| 7 | $u_7 = [1\ (-1+j)/\sqrt{2}\ j\ (1+j)/\sqrt{2}]^T$ | $W_7^{(1)}$ | $W_7^{(14)}/\sqrt{2}$ | $W_7^{(134)}/\sqrt{3}$ | $W_7^{(1234)}/2$ |
| 8 | $u_8 = [1\ -1\ 1\ 1]^T$ | $W_8^{(1)}$ | $W_8^{(14)}/\sqrt{2}$ | $W_8^{(134)}/\sqrt{3}$ | $W_8^{(1234)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(14)}/\sqrt{2}$ | $W_{10}^{(134)}/\sqrt{3}$ | $W_{10}^{(1234)}/2$ |
| 11 | $u_{11} = [1\ j\ -1\ j]^T$ | $W_{11}^{(1)}$ | $W_{11}^{(14)}/\sqrt{2}$ | $W_{11}^{(134)}/\sqrt{3}$ | $W_{11}^{(1234)}/2$ |
| 12 | $u_{12} = [1\ -1\ -1\ 1]^T$ | $W_{12}^{(1)}$ | $W_{12}^{(14)}/\sqrt{2}$ | $W_{12}^{(134)}/\sqrt{3}$ | $W_{12}^{(1234)}/2$ |
| 13 | $u_{13} = [1\ -1\ 1\ -1]^T$ | $W_{13}^{(1)}$ | $W_{13}^{(14)}/\sqrt{2}$ | $W_{13}^{(134)}/\sqrt{3}$ | $W_{13}^{(1234)}/2$ |
| 14 | $u_{14} = [1\ 1\ -1\ -1]^T$ | $W_{14}^{(1)}$ | $W_{14}^{(14)}/\sqrt{2}$ | $W_{14}^{(134)}/\sqrt{3}$ | $W_{14}^{(1234)}/2$ |
| 15 | $u_{15} = [1\ 1\ 1\ 1]^T$ | $W_{15}^{(1)}$ | $W_{15}^{(14)}/\sqrt{2}$ | $W_{15}^{(134)}/\sqrt{3}$ | $W_{15}^{(1234)}/2$ |

Table 3 illustrates the case where 4 antenna port indices are set to 0, 1, 2, and 3. Specifically, the "number of layers" in Table 3 indicates the number of antenna ports that are used for data transmission among the 4 antenna ports of indices 0, 1, 2, and 3 and "$W_n^{(s)}$" denotes a matrix defined by a column(s) indicated by "s" from a matrix expressed as follows.

$$W_n = I - 2u_n u_n^H / u_n^H u_n \quad \text{[MATHEMATICAL EXPRESSION 4]}$$

Here, "I" denotes a 4×4 identity matrix and "$u_n$" denotes a vector defined in the above Table 3. For example, the case where a preceding matrix $W_0^{\{14\}}/\sqrt{2}$ is selected from the codebook of Table 3 corresponds to the case where a data symbol is transmitted through two layers. This indicates that data is precoded using a matrix (i.e., $$\text{i.e.,}\ \frac{1}{\sqrt{2}}\begin{pmatrix}1 & 1\\1 & -1\\1 & -1\\1 & 1\end{pmatrix}$$

defined by first and fourth column vectors selected from the $W_0$ matrix calculated through the above Mathematical Expression 4.

However, if two HARQ process blocks are not always transmitted (i.e., if one HARQ process block is transmitted) in the case where simultaneously transmitted HARQ process blocks share indices as in the case of FIG. 10 and Table 2, there is a problem in that process blocks sharing indices are not discriminated from each other. In addition, there is a possibility that whether one HARQ process block is transmitted or two HARQ process blocks are transmitted may not be able to be determined since HARQ process blocks have been set to share HARQ process block indices.

That is, the following additional control information items are required when simultaneously transmitted HARQ process blocks are set to share indices as in FIG. 10.

The number of simultaneously transmitted HARQ process blocks

Identification information indicating an HARQ process block(s) that has been requested to be retransmitted when a smaller number of HARQ process blocks than the number of HARQ process blocks that were initially transmitted are retransmitted.

For example, in the case where, after two HARQ process blocks are transmitted through shared HARQ process block indices, only one of the two HARQ process blocks is retransmitted, the additional information (2) indicates an identifier that can definitely identify the retransmitted HARQ process block. The following is a description of the case where additional control information is used to discriminate between HARQ process blocks that are simultaneously transmitted.

Figure 11:
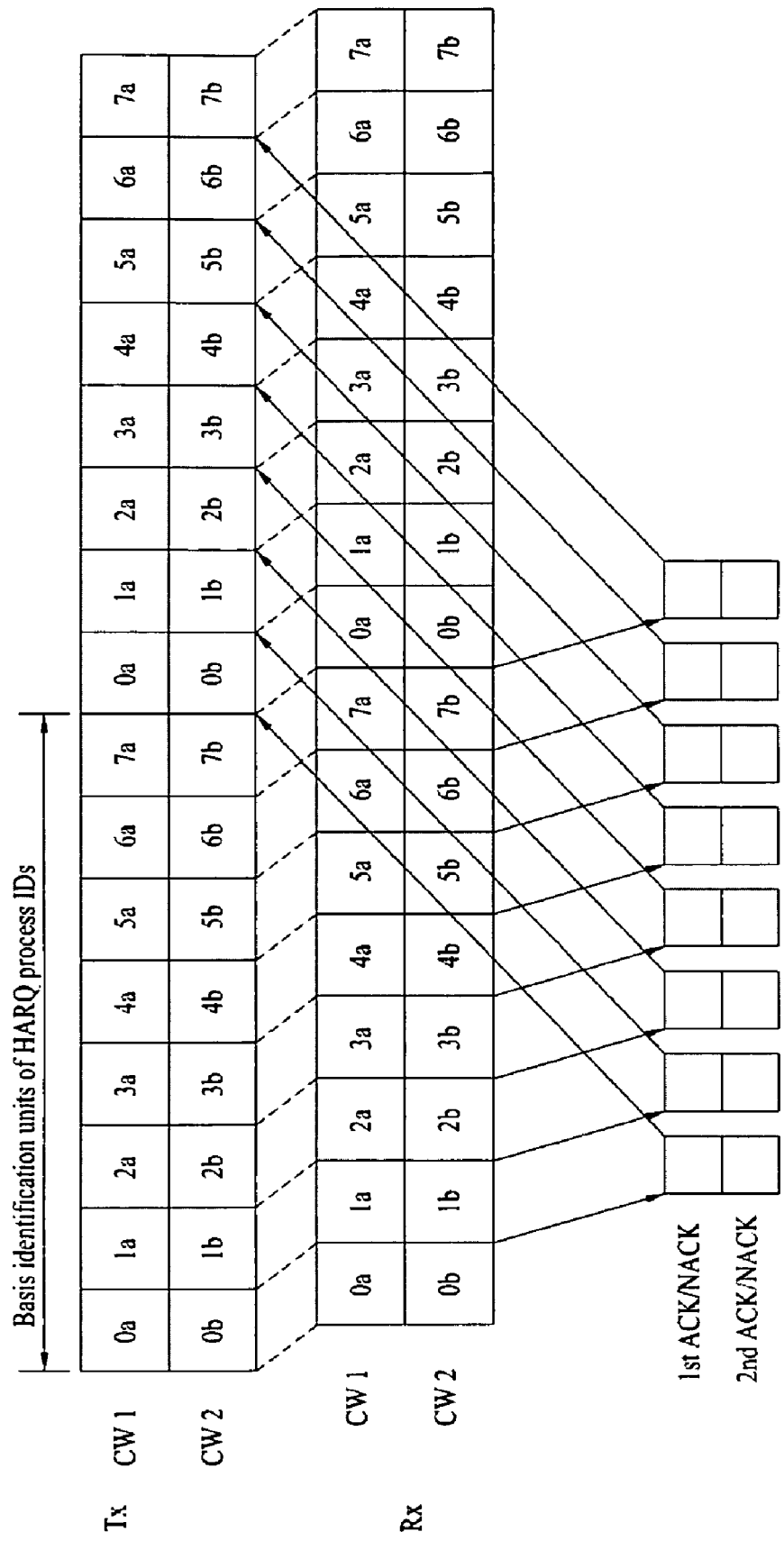
FIG. 11 illustrates an example wherein additional control information is used to discriminate HARQ process blocks that are simultaneously transmitted.

FIG. 11 illustrates an example wherein additional control information is used to discriminate between HARQ process blocks that are simultaneously transmitted.

In the case where simultaneously transmitted HARQ process blocks share process block indices, it is required that process blocks be discriminated when they are retransmitted as described above. Therefore, the HARQ process blocks are divided into HARQ process blocks "a" and "b" using additional control information in this example. However, in the case of FIG. 11, it is assumed that HARQ process blocks "a" and "b" corresponding to each process block index can be swapped with each other when they are initially transmitted. Accordingly, additional signaling for IDs used to discriminate between simultaneously transmitted HARQ process blocks and the number of HARQ process blocks that can be simultaneously transmitted as described above can be expressed as follows.

TABLE 4

| Control information | Size [bits] |
|---|---|
| Whether CW1 or CW2 (a or b) | 1 |
| Number of CWs simultaneously | 1 |

On the other hand, in the case where an additional codeword-to-layer mapping method as shown in FIG. 8 is used as suggested in the above embodiment, a preceding vector that can be used for retransmission should be added to the codebook as shown in Table 3. This increases the size of the "number of layer" field in Table 2, thereby hindering efficient use of resources. That is, although the current "number of layers" field among the control information fields in Table 2 can be represented by a total of 4 combinations including one mapping combination per layer, the addition of the layer mapping combination as shown in FIG. 8 may increase the number of required bits.

Accordingly, a preferred embodiment of the present invention suggests a method in which data is transmitted such that required information can be implicitly obtained from information of another control information field in order to reduce overhead while supporting the retransmission mapping scheme as shown in FIG. 8.

Specifically, in this embodiment, whether the corresponding data is newly transmitted data or retransmitted data can be determined through the RSN in Table 2. Therefore, when preceding information is constructed among the control information fields as shown in Table 2, this embodiment suggests a method in which the preceding information is set such that a different codebook from that used for initial transmission is used for retransmission and a preceding vector that can be used for retransmission is indicated through a predetermined Precoding Vector Index (PMI) so as to prevent an increase of overhead of control information while supporting the additional mapping scheme for retransmission as shown in FIG. 8.

For example, if the "number of layers" in the codebook is 2 and retransmission is indicated in the RSN field, a predetermined preceding vector in the codebook can be set as a preceding vector to be used for the mapping scheme as shown in FIG. 8 in which one HARQ process block is mapped to two layers so as to be retransmitted through two or four antennas.

If this method is used, both the preceding information field and the "number of layers" field can serve as a "Number of Cws simultaneously" field of Table 4, thereby eliminating the need to transmit such an additional control signal.

For example, in the case where data is transmitted using a general codebook as shown in Table 3 during initial data transmission and retransmission is indicated through the RSN, a specific index (for example, PMI=15) among preceding matrix indices PMI for the case where the "number of layers" field is 2 in the codebook as shown in Table 3 can be defined as indicating that a preceding vector supporting the mapping scheme as shown in FIG. 8 is used and can be set to perform preceding using the preceding vector.

Accordingly, when the RSN in the control information as shown in Table 2 indicates that the corresponding data is retransmission data, the transmitting end can determine that a codebook for retransmission is used. Thereafter, if the PMI indicates "15" and the "number of layers" field indicates that two layers are used in the above example, it is possible to perform preceding using a preceding matrix that has been set to perform preceding as shown in FIG. 8.

Specifically, in the case where it is indicated by the "number of layers" field that two layers are used and a corresponding preceding scheme is indicated by a specific PMI (for example, PMI=15) in the codebook for retransmission suggested according to this embodiment, layer mapping and preceding can be expressed as follows.

First, the procedure in which one codeword is mapped to two layers as shown in FIG. 8 can be expressed by the following equations.

$$x^{(0)}(i)=d^{(0)}(2i)$$

$$x^{(1)}(i)=d^{(0)}(2i+1), M_{symb}^{layer}=M_{symb}^{(0)}/2,$$

where $i=0, 1, \ldots, M_{symb}^{layer}$−[MATHEMATICAL EXPRESSION 5]

Here, $d^{(q)}(i)$ indicates an ith symbol index of a codeword q and $x^{(l)}(i)$ indicates an ith symbol mapped to an lth layer. In addition, $M_{symb}^{layer}$ indicates the number of symbols mapped to each layer. Symbols included in a codeword indicated by an index 0 in Mathematical Expression 5 are alternately mapped to each layer, thus satisfying the relation of $M_{symb}^{layer}=M_{symb}^{(0)}/2$.

That is, Mathematical Expression 5 indicates a mapping scheme in which one codeword having an index of 0 is mapped to two layers having indices of 0 and 1. Thus, it can be seen that this mapping scheme is identical to that of FIG. 8.

Symbol data mapped to two layers can be mapped to two antenna ports through a preceding calculation as follows when corresponding preceding is indicated through a PMI value of 15 and it is also indicated through the "number of layers" field that two layers are used.

[Mathematical Expression 6]

$$\begin{bmatrix} y^{(0)}(2i) \\ y^{(1)}(2i) \\ y^{(0)}(2i+1) \\ y^{(1)}(2i+1) \end{bmatrix} = \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^0(i)) \\ \text{Re}(x^{(1)}(i)) \\ \text{Im}(x^{(0)}(i)) \\ \text{Im}(x^{(1)}(i)) \end{bmatrix}$$

for $i = 0, 1, \ldots, M_{symb}^{layer}-1$ with $M_{symb}^{ap} = 2M_{symb}^{layer}$ Here, $y^{(p)}(i)$ indicates an ith symbol mapped to a pth antenna and $x^{(l)}(i)$ indicates an ith symbol mapped to an lth antenna. In addition, Re(X) indicates a real component of X and Im(X) indicates an imaginary component of X. Further, $M_{symb}^{ap}$ denotes the number of symbol blocks mapped to each antenna.

That is, Mathematical Expression 6 indicates preceding for mapping a symbol mapped to two layers to two antennas as shown in FIG. 8, thereby obtaining an output symbol $y(i)=[y^{(0)}(i)\ y^{(1)}(i)]^T$ mapped to two antennas.

In this embodiment, in the case where data retransmission is identified through the RSN, a predetermined index among codebook indices is defined as an index indicating that an additional preceding calculation is performed, thereby allowing the transmitting end to set layer mapping and corresponding preceding as shown in FIG. 8 to be performed without additional control information.

Another embodiment of the present invention suggests a layer mapping method additionally defined for retransmission, which supports not only the case where one codeword is mapped to two layers as shown in FIG. 8 but also the case where one codeword is mapped to four layers.

That is, this embodiment suggests a method in which the PMI (for example, a PMI value of 15) in the codebook for retransmission used in the case where retransmission is indicated through the RSN is used and a layer mapping scheme and corresponding preceding for retransmission are additionally defined not only for the case where two layers are used but also for the case where four layers are used are additionally defined and used through the "number of layers" field.

Figure 12:
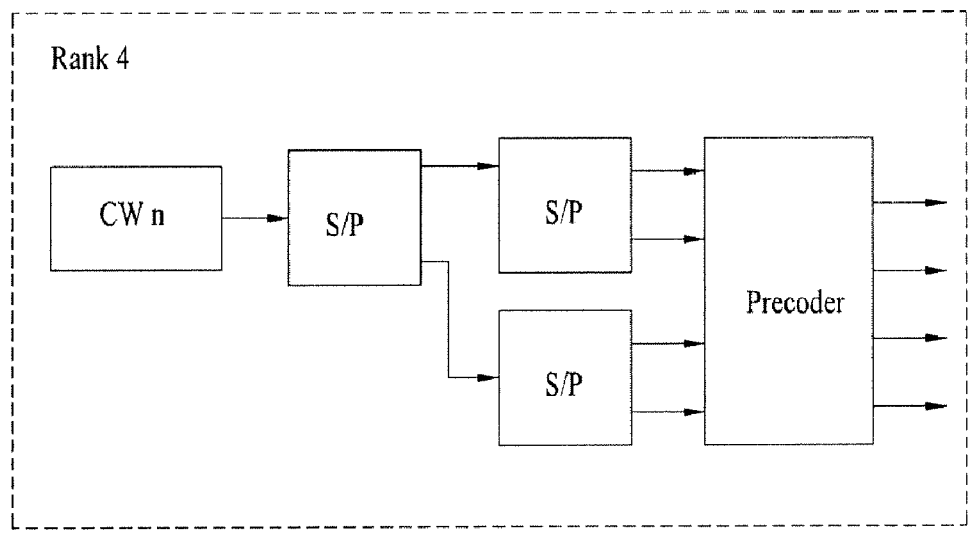
FIG. 12 illustrates a layer mapping method for retransmission additionally defined through implicit analysis of control information according to another embodiment of the present invention.

FIG. 12 illustrates a layer mapping method for retransmission additionally defined through implicit analysis of control information according to another embodiment of the present invention.

Specifically, FIG. 12 illustrates a scheme wherein one codeword is mapped to four layers. This layer mapping scheme has an advantage in that additional transmit diversity can be achieved in the case of retransmission. The following is a mathematical expression of the scheme in which one codeword is mapped to four layers as shown in FIG. 12.

$$x^{(0)}(i)=d^{(0)}(4i)$$

$$x^{(1)}(i)=d^{(0)}(4i+1)$$

$$x^{(2)}(i)=d^{(0)}(4i+2)$$

$$x^{(3)}(i)=d^{(0)}(4i+3), M_{symb}^{layer}=M_{symb}^{(0)}/4,$$

where $i=0, 1, \ldots, M_{symb}^{layer}$ -[MATHEMATICAL EXPRESSION 7]

Here, $d^{(q)}(i)$ indicates an ith symbol index of a codeword q and $x^{(l)}(i)$ indicates an ith symbol mapped to an lth layer as in Mathematical Expression 5. In addition, $M_{symb}^{layer}$ indicates the number of symbols mapped to each layer. Symbols included in a codeword indicated by an index 0 in Mathematical Expression 7 are sequentially mapped to each layer at intervals of four indices, thus satisfying the relation of $M_{symb}^{layer}=M_{symb}^{(0)}/4$.

On the other hand, a symbol mapped to four layers in this manner may be set such that the following preceding defined for the case where the "number of layers" field indicates four layers and the PMI is 15 in the codebook for retransmission according to this embodiment is performed on the symbol at a later time.

[MATHEMATICAL EXPRESSION 8]

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix}$$

for $i = 0, 1, \ldots, M_{symb}^{layer} - 1$ with $M_{symb}^{ap} = 4M_{symb}^{layer}$ Here, $y^{(p)}(i)$ indicates an ith symbol mapped to a pth antenna and $x^{(l)}(i)$ indicates an ith symbol mapped to an lth antenna as in Mathematical Expression 6. In addition, Re(X) indicates a real component of X and Im(X) indicates an imaginary component of X. Further, $M_{symb}^{ap}$ denotes the number of symbol blocks mapped to each antenna.

According to the above embodiment, it is possible to support a scheme, in which one codeword is mapped to four layers and corresponding preceding is performed, using only information illustrated in the above Table 2 without additional control information or signaling.

Although, in the above embodiments, the preceding scheme applied when it is indicated through the "number of layers" field that two or four layers are used has been described above with reference to an example wherein a PMI of "15" is used as an index indicating preceding additionally defined for retransmission, a different index may also be used to indicate the additional preceding. In addition, the number of preceding schemes additionally defined for retransmission may be two or more and, accordingly, two or more indices may be set to indicate that preceding for retransmission is to be performed.

Separately using a codebook for initial transmission and a codebook for retransmission according to the present invention not only reduces control signal overhead without additional control information but also overcomes the problem that occurs when the rank number is forcibly reduced for retransmission as described above.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

According to each of the embodiments of the present invention described above, it is possible to efficiently define and use a codeword-to-layer mapping scheme for retransmission in a MIMO system that uses an HARQ scheme and also to obtain required information using existing control information, thereby more efficiently retransmitting signals in terms of control signal overhead.

The methods according to the present invention described above can be applied in the same manner to a variety of communication systems in which a MIMO system that uses an HARQ scheme such as the 3GPP LTE system or the IEEE 802.16 system can be implemented.

What is claimed is:

1. A method for transmitting a signal from a transmitting end in a Multi-Input Multi-Output (MIMO) system that uses a Hybrid Automatic Repeat reQuest (HARQ) scheme, the method comprising:

performing signal mapping according to a codeword-to-layer mapping scheme for retransmission when a codeword is a retransmission codeword and an initial transmission codeword corresponding to the retransmission codeword was transmitted by mapping to a plurality of layers, wherein the codeword-to-layer mapping scheme includes a scheme for mapping the retransmission codeword to the plurality of layers;

performing precoding on the mapped signal based on a codebook for retransmission; and transmitting the precoded signal using a plurality of antennas, wherein the initial transmission codeword was transmitted with an additional initial transmission codeword, and the retransmission codeword is transmitted alone, and wherein the MIMO system supports both the codebook for retransmission and a codebook for initial transmission which is different from the codebook for retransmission.

2. The method according to claim 1, wherein the codebook for retransmission includes only at least one predetermined index indicating a precoding vector supporting the codeword-to-layer mapping scheme.

3. The method according to claim 2, wherein the retransmission codeword is identified by a Retransmission Sequence Number (RSN) field of control information.

4. The method according to claim 3, wherein:

each of the at least one predetermined index indicates a first precoding vector that supports a scheme for mapping the retransmission codeword to two layers and a second precoding vector that supports a scheme for mapping the retransmission codeword to four layers; and the transmitting end selects the first precoding vector or the second precoding vector to be used for the transmission of the precoded signal according to number-of-layer information indicated by the control information.

5. The method according to claim 1, wherein the retransmission codeword is not transmitted with the additional initial transmission codeword or another retransmission codeword.

* * * * *